(12) United States Patent
McCollom

(10) Patent No.: US 8,408,047 B2
(45) Date of Patent: Apr. 2, 2013

(54) UNIVERSAL ADAPTER FOR A FUEL TANK FILLER NECK TO TEST A FUEL TANK FOR LAKES

(75) Inventor: Gregory Michael McCollom, Anaheim Hills, CA (US)

(73) Assignee: STAR EnviroTech, Inc., Huntington Beach, CA (US)

( * ) Notice: Subject to any disclaimer, the term of this patent is extended or adjusted under 35 U.S.C. 154(b) by 946 days.

(21) Appl. No.: 12/459,274

(22) Filed: Jun. 30, 2009

(65) Prior Publication Data

US 2010/0326567 A1 Dec. 30, 2010

(51) Int. Cl.
*G01M 3/02* (2006.01)

(52) U.S. Cl. ............ 73/40.7; 73/49.2; 137/799; 141/63; 141/65; 141/383

(58) Field of Classification Search ............. 141/63, 141/64, 65, 66, 383; 137/798, 799; 73/40.7, 73/49.2
See application file for complete search history.

(56) References Cited

U.S. PATENT DOCUMENTS

| | | | |
|---|---|---|---|
| 2,714,898 A * | 8/1955 | Reese | 141/311 R |
| 2,956,737 A * | 10/1960 | Hager | 141/383 |
| 4,497,290 A * | 2/1985 | Harris | 137/565.25 |
| 4,750,634 A * | 6/1988 | Herman | 137/145 |
| 4,899,896 A * | 2/1990 | Metzger | 141/98 |
| 5,425,266 A * | 6/1995 | Fournier | 73/49.7 |
| 5,507,176 A * | 4/1996 | Kammeraad et al. | 73/49.2 |
| 7,168,297 B2 * | 1/2007 | Herzog et al. | 73/49.2 |

* cited by examiner

*Primary Examiner* — Gregory Huson
*Assistant Examiner* — Nicolas A Arnett
(74) *Attorney, Agent, or Firm* — Morland C. Fischer

(57) ABSTRACT

A universal adapter to be detachably connected to the round fuel cap retaining lip of most any fuel tank filler neck so that smoke (i.e., a vapor) under pressure can be delivered to the fuel tank of a motor vehicle to test the fuel system for leaks. When connected, the universal adapter lies entirely outside the fuel tank filler neck. The universal adapter includes a circular ring-shaped rim that is manufactured from a flexible material having a spring memory. The flexible rim of the universal adapter is stretched and attached in surrounding sealing engagement against the fuel cap retaining lip of the filler neck. The universal adapter also includes a vapor inlet tube to which the nozzle of a vapor supply hose is attached. According to one embodiment, smoke produced by a smoke-generating machine pressurizes the fuel tank by way of a vapor delivery path which includes the vapor inlet tube of the universal adapter and the fuel tank filler neck of the motor vehicle.

5 Claims, 1 Drawing Sheet

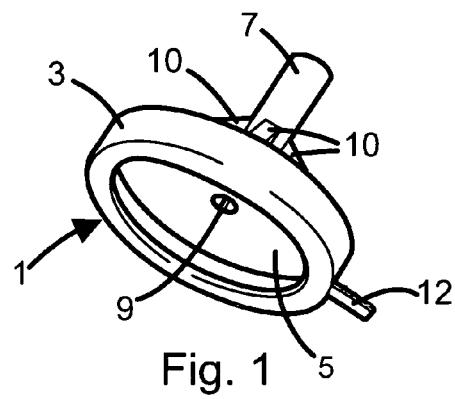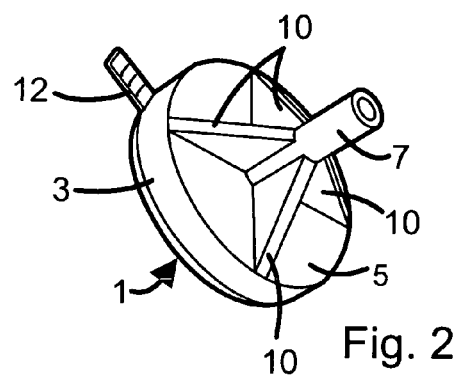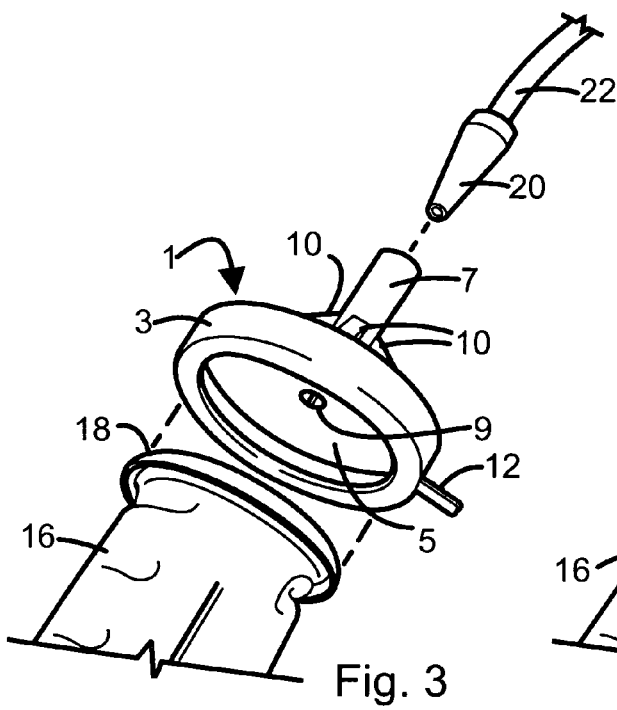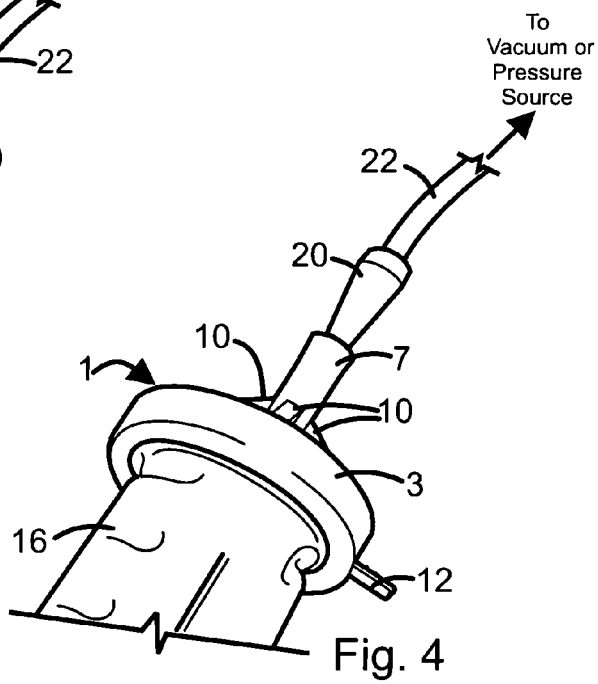

UNIVERSAL ADAPTER FOR A FUEL TANK FILLER NECK TO TEST A FUEL TANK FOR LAKES

BACKGROUND OF THE INVENTION

1. Field of the Invention

This invention relates to a universal adapter to be mated in sealing engagement around the outside of the fuel tank filler neck of most fuel-driven motor vehicles so that a source of pressure (e.g., a vapor) or a source of vacuum can be connected to the fuel tank of the vehicle by way of the adapter and the filler neck to enable the fuel tank to be tested for leaks.

2. Background Art

Fuel tanks, vapor lines and components associated therewith of a motor vehicle are known to experience cracks, holes and fissures for a variety of reasons. By way of a first example, a rock or another object encountered along the roadway may strike the fuel tank while the vehicle is in motion. By way of another example, normal wear and tear and/or the caustic effects of gasoline may, over time, cause the fuel tank, vapor lines and components to degrade. In either case, because the damage caused to the fuel tank is typically very small, such damage is often difficult to detect and locate to enable repairs to be made. The result of not being able to accurately locate and repair the damage is that fuel fluid and/or vapor may leak from the fuel tank, vapor lines or components, whereby the environment is exposed to toxic fumes.

It has been known to generate and deliver a visible vapor (sometimes known as "smoke") to a closed fluid system in order to detect the presence and location of leaks by visually inspecting the system for any vapor escaping therefrom. In this regard, vapor can be delivered to a fuel tank by way of the fuel tank filler neck in order to pressurize the fuel tank to be tested for leaks. However, once the fuel cap is removed, a coupler is necessary to enable the vapor to be supplied from a vapor source to the open mouth of the fuel tank filler neck. The couplers heretofor being used to interconnect the vapor source to the filler neck are known to be generally expensive, complex and/or difficult to install and remove. In particular, some couplers include a fitting that must be attached to the fuel tank filler neck at the interior thereof. Because the inside configuration of the filler neck varies from one vehicle to another, different couplers having fittings of correspondingly different size and dimensions are needed to be able to adequately test the fuel tanks of different vehicles. Consequently, automotive repair facilities are required to keep a variety of couplers on hand which increases their operating cost as well as the cost passed through to customers. Other couplers are known to use adhesive tape as a means by which the coupler is attached to the fuel tank filler neck. Such adhesive tape must be pealed off and the filler neck cleaned following each leak test.

What would be desirable is a low-cost, easy to install, and reusable adapter by which a pressure or vacuum source can be efficiently and reliably coupled to the fuel tank filler neck of the fuel tank of almost any motor vehicle regardless of the inside configuration of the filler neck to enable the fuel tank to be tested for leaks.

SUMMARY OF THE INVENTION

In general terms, a universal adapter is disclosed to be removably attached in sealing engagement with the round fuel cap retaining lip that runs circumferentially around the open mouth of the fuel tank filler neck of most fuel-driven motor vehicles so that the fuel tank, its vapor lines and components can be tested for leaks regardless of the vehicle and the inside configuration of the fuel tank filler neck. The universal adapter herein disclosed couples a source of pressure or a source of vacuum to the fuel tank by way of the fuel tank filler neck. In the case where a pressure source is coupled to the fuel tank, a supply of gas (e.g., a vapor sometimes known as "smoke") pressurizes the fuel tank so that the tank, the vapor lines and components can be mechanically tested or visually monitored for smoke escaping therefrom. In the case where a vacuum source is coupled to the fuel tank, a vacuum is created within the tank so that a vacuum-decay test can be performed.

The universal adapter includes a circular ring-shaped rim that is manufactured from a flexible material (e.g., rubber) capable of being stretched. The rim surrounds a flat base having an entry port formed therethrough. An inlet tube extends from the base so as to lie in axial alignment and communicate with the entry port. The rim is stretched in order to surround the fuel cap retaining lip of the fuel tank filler neck in response to a pulling force applied to a pull tab which extends from the rim. Once the adapter is attached, the flat base surrounded by the rim extends across the mouth of the fuel tank filler neck such that the adapter seals against the fuel cap retaining lip entirely outside the fuel tank filler neck. The source of pressure or vacuum is connected to the universal adapter to establish either one of a vapor delivery path or a suction path between the source and the fuel tank of the vehicle via the inlet tube and the entry port of the adapter.

BRIEF DESCRIPTION OF THE DRAWINGS

FIGS. 1 and 2 are perspective views showing a universal adapter according to a preferred embodiment of this invention to be removably attached to a fuel tank filler neck to enable a fuel tank, its vapor lines and component parts of a motor vehicle to be tested for leaks;

FIG. 3 is an exploded view showing the universal adapter of FIGS. 1 and 2 for coupling a source of smoke (a vapor) or a source of vacuum to a fuel tank filler neck; and FIG. 4 shows the fuel tank filler neck of FIG. 3 coupled to a source of smoke or vacuum by way of the universal adapter and a vapor delivery or suction hose.

DESCRIPTION OF THE PREFERRED EMBODIMENT

A preferred embodiment for a universal adapter for a fuel filler tank which forms the present invention is described while referring initially to FIGS. 1 and 2 of the drawings. The universal adapter 1 includes a circular ring-shaped rim 3 which surrounds and extends downwardly from a flat base 5. As an important detail of the universal adapter 1 herein disclosed, the rim 3 is flexible so as to be adapted to stretch for an advantage that will be described in greater detail hereinafter when referring to FIGS. 3 and 4. A hollow cylindrical vapor (i.e., gas) inlet tube 7 projects upwardly from the base 5 of adapter 1. A vapor (i.e., gas) entry port 9 is formed through the base 5 so as to lie in axial communication with the vapor inlet tube 7. By way of example only, the universal adapter 1 is preferably manufactured (e.g., molded) from a resilient material (e.g., nitrile butadiene rubber) that is capable of avoiding degradation and contamination as a consequence of the caustic effects of petroleum products (e.g., gasoline or diesel) to which the universal adapter 1 may be exposed during use.

Located atop the flat base 5 of the universal adapter 1 are a plurality of (e.g., triangular) reinforcing support ribs 10. The support ribs 10 extend radially along the base 5 between the vapor inlet tube 7 and the circular rim 3. The support ribs 10 preserve the axial alignment of the vapor entry port 9 through base 5 with the hollow cylindrical vapor inlet tube 7. A pull tab 12 projects outwardly from the rim 3 of adapter 1. A pulling force manually applied to the pull tab 12 is transferred to the rim 3 when it is desirable to attach or remove the universal adapter 1 to or from an automotive fuel tank filler neck as will now be disclosed.

The operation of the universal adapter 1 and the detachable mating engagement of adapter 1 to a fuel tank filler neck 16 is now described while referring to FIGS. 3 and 4 of the drawings. A fuel tank filler neck 16 is common to most fuel-driven motor vehicles and provides means to deliver fuel from a source thereof (e.g., a gasoline or diesel pump) to the fuel tank carried by the vehicle. Although the size and/or inside configuration of the filler neck 16 may change from one vehicle to another, the round lip 18 which extends circumferentially around the top thereof is known to have a constant diameter. That is to say, regardless of the type or make of motor vehicle and the particular fuel tank filler neck associated therewith, the size of the lip 18 at the open top end of the filler neck 16 is standardized. After the motor vehicle has been fueled, the filler neck 16 is closed and sealed by means of a fuel cap (not shown) being tightened around the lip 18. The fuel cap is removed from the fuel tank filler neck 16 at those times when fuel is added to the fuel tank of the vehicle. At the conclusion of the refueling process, the aforementioned fuel cap is once again connected to the lip 18 to prevent the escape of hydrocarbon vapors and the evaporation of fuel from the vehicle fuel tank.

The fuel cap is also removed from the lip 18 of the fuel tank filler neck 16 during those times when it is desirable to test the fuel system of a motor vehicle for leaks by applying a pressure or a vacuum to the fuel tank and the vapor lines and component parts which communicate therewith. By way of example only, one means to pressurize the fuel tank for the purpose of leak detection is to apply a vapor to the tank by way of the fuel tank filler neck 16. Such a vapor to be delivered to the fuel tank is sometimes known to those in the art as "smoke" (a liquid petroleum product that is heated to convert the liquid to a visible vapor). Reference in this regard may be made to U.S. Pat. Nos. 6,142,009; 6,526,808 and 6,477,890 for examples of a smoke generator for creating the vapor necessary to pressurize and fill the fuel tank of a motor vehicle with smoke during leak detection.

In order to initiate the leak detection process, the universal adapter 1 of this invention is first removably attached to the fuel tank filler neck 16. To this end, because the round fuel cap retaining lip 18 of filler neck 16 has in most cases a known, constant diameter, the ring-shaped rim 3 of adapter 1 has a corresponding (e.g., 5 cm) inside diameter to accommodate the lip 18 therewithin regardless of the other dimensions of the fuel tank filler neck 16. Unlike some conventional adapters which fit inside the filler neck 16, the universal adapter 1 of the present invention is advantageously mated to the filler neck 16 around the fuel cap retaining lip 18 thereof so as to seal against the lip entirely outside the filler neck.

More particularly, the flexible rim 3 of the universal adapter 1 has a spring memory. Thus, the rim 3 of adapter 1 is capable of being stretched and stressed in response to a pulling force applied to the pull tab 12 as the rim 3 is positioned over and around the lip 18 of filler neck 16. By virtue of its spring memory, the rim 3 of universal adapter 1 will automatically relax and seat against the lip 18 of filler neck 16 to establish a gas-tight seal therearound. With the universal adapter 1 removably attached to the fuel tank filler neck 16 (best shown in FIG. 4), the flat base 5 that is surrounded by the rim 3 will lay across the top of and close the filler neck 16. However, a vapor (i.e., gas) delivery path is established to the fuel tank of the motor vehicle which includes the fuel tank filler neck 16 of the vehicle and the hollow cylindrical vapor inlet tube 7 as well as the vapor entry port 9 of the universal adapter 1 which communicates with access tube 7 through the base 5.

After the rim 3 of the universal adapter 1 is mated in sealing engagement around the lip 18 so as to lie outside the fuel tank filler neck 16, the vapor supply nozzle 20 of a smoke generator (not shown) is coupled to the vapor inlet tube 7 of adapter 1 (also best shown in FIG. 4). The vapor supply nozzle 20 receives a supply of visible vapor, under pressure, from the smoke generator via a vapor supply hose 22 running therebetween. The vapor is delivered from the nozzle 20 to the fuel tank under test by way of the aforementioned vapor delivery path including the vapor inlet tube 7 and the vapor entry port 9 of the universal adapter 1 and the fuel tank filler neck 16 of the motor vehicle. Once pressurized, the fuel system of the motor vehicle is monitored for leaks by conventional testing methods such as, for example, by looking for the escape of smoke from the fuel tank, the vapor lines and associated components. In the alternative a mechanical pressure decay test can be performed.

The spring memory of the resilient universal adapter 1 holds the flexible rim 3 in a tight sealing engagement around the lip 18 of filler neck 16 during testing of the fuel system. When the testing has been completed, the flexible universal adapter 1 is removed from the filler neck 16 by simply applying an outward pulling force to the pull tab 12 which causes the rim 3 to once again stretch so as to break the seal between the rim 3 and the lip 18 of filler neck 16. An upward pulling force is then applied to the pull tab 12 to cause the universal adapter 1 to separate from the filler neck 16. The vapor supply nozzle 20 of the smoke generating machine can be removed from the vapor inlet tube 7 of adapter 1 at any time.

The universal adapter 1 herein disclosed is relatively inexpensive to manufacture and easy to install and remove. The universal adapter 1 can be advantageously reused regardless of the motor vehicle. In other words, because the rim 3 of the adapter 1 can be stretched to fit around the fuel cap retaining lip of most any fuel tank filler neck, the adapter 1 has application for testing the fuel system of virtually any motor vehicle so as to obviate the necessity that different sized filler neck couplers be kept on hand by motor vehicle repair facilities.

Rather than testing a fuel tank for leaks by using the universal adapter 1 in a vapor (i.e., gas) delivery path by which to supply smoke to the fuel tank filler neck 16 to pressurize the fuel tank, it is within the scope of this invention to connect any source of suitable gas (e.g., air or nitrogen) to the vapor inlet tube 7 of adapter 1. The gas will pressurize the fuel tank to enable leaks to be detected by means of a conventional pressure decay test or the like. What is even more, a source of vacuum in place of the aforementioned vapor/gas pressure source may also be connected to the inlet tube 7 of the universal adapter 1 (best illustrated in FIG. 4). In this case, a suction path will be established from the fuel tank to the vacuum source via the filler neck 16 of the vehicle and the entry port 9 and inlet tube 7 of adapter 1 to enable leaks to be detected by means of a conventional vacuum decay test or the like. Reference may be made to U.S. Pat. No. 7,387,014 for an example of a suitable vacuum-generating device.

The invention claimed is:

1. For a fuel tank filler neck for delivering fuel to a fuel tank of a motor vehicle and having a fuel cap retaining lip extending around an open end thereof, the combination comprising;

source of pressure;

a source of vacuum;

a supply hose to be connected to either one of said source of pressure or said source of vacuum; and a universal adaptor by which to couple said, supply hose to the fuel tank filler neck to create one of a pressure delivery path to the fuel tank when said supply hose is connected to the source of pressure or a suction path from the fuel tank when said supply hose is connected to the source of vacuum in order to test the fuel tank for leaks, said universal adapter including a rim that is sized to surround the fuel cap retaining lip of the filler neck, said rim having a sealing surface that lies in sealing engagement against the fuel cap retaining it and entirely outside the fuel tank filler neck, said universal adapter also including an inlet tube detachably connected to said supply hose, said net tube adapted to be disconnected from said supply hose after said supply hose is connected to one of said source of pressure or said source of vacuum, and said inlet tube further adapted to be reconnected to said supply hose when said supply hose is connected to the other one of said source of pressure or said source of vacuum.

2. The combination recited in claim 1, wherein the rim of said universal adapter is manufactured from a flexible material having at spring memory.

3. The combination recited in claim 2, wherein said universal adapter also includes a pull tab extending from said rim such that a pulling force applied to said pull tab causes said rim to stretch for attaching said rim to or removing said rim from the fuel cap retaining lip of the filler neck.

4. The combination recited in claim 2, wherein the rim of said universal adapter is manufactured from rubber.

5. The combination recited in claim 1, wherein said universal adapter also includes a flat base surrounded by said rim and positioned so as to lie across the fuel cap retaining lip at the open end of said fuel tank filler neck, said flat base having an entry port formed therethrough which communicates with said inlet tube.

* * * * *

UNITED STATES PATENT AND TRADEMARK OFFICE
CERTIFICATE OF CORRECTION

| | |
|---|---|
| PATENT NO. | : 8,408,047 B2 |
| APPLICATION NO. | : 12/459274 |
| DATED | : April 12, 2013 |
| INVENTOR(S) | : Gregory M. McCollom |

Page 1 of 1

It is certified that error appears in the above-identified patent and that said Letters Patent is hereby corrected as shown below:

Title Page, Item (54) and in the specification, Column 1, line 3, in the title, change "LAKES" to --LEAKS--.

Signed and Sealed this
Sixth Day of August, 2013

Teresa Stanek Rea
*Acting Director of the United States Patent and Trademark Office*